United States Patent [19]
Wagner
[11] 4,282,135
[45] Aug. 4, 1981

[54] AMINOPLAST DISPERSIONS AND POLYURETHANES PREPARED THEREFROM

[75] Inventor: Kuno Wagner, Leverkusen-Steinbuechel, Fed. Rep. of Germany

[73] Assignee: Bayer Aktiengesellschaft, Leverkusen, Fed. Rep. of Germany

[21] Appl. No.: 124,161

[22] Filed: Feb. 25, 1980

Related U.S. Application Data

[62] Division of Ser. No. 464,099, Apr. 25, 1974, Pat. No. 4,225,481.

[30] Foreign Application Priority Data

May 12, 1973 [DE] Fed. Rep. of Germany ....... 2324134

[51] Int. Cl.[3] .............................................. C08K 5/05
[52] U.S. Cl. ...................... 260/33.4 UR; 260/33.2 R; 528/229; 528/232
[58] Field of Search ................. 260/33.2 R, 33.4 UR; 528/232, 229

[56] References Cited

U.S. PATENT DOCUMENTS 3,304,273 2/1967 Stamberger ......................... 521/109

*Primary Examiner*—Lorenzo B. Hayes
*Assistant Examiner*—Amelia B. Yarbrough
*Attorney, Agent, or Firm*—Gene Harsh; Joseph C. Gil; Lyndanne M. Whalen

[57] ABSTRACT

A stable dispersion of an aminoplast which is obtained by a process which comprises condensing ammonia hydrazine or an organic compound having a molecular weight of from about 50 to about 400 and which contains at least two groups selected from the group consisting of —$NH_2$ and —NH— with benzoquinone or a compound of the formula R—CO—R′ in which R and R′ stand for the same or different radicals selected from the group consisting of hydrogen $C_1$–$C_4$ alkyl groups which may carry chlorine substituents, $C_2$–$C_4$-alkenyl groups, $C_6$–$C_{10}$ aryl groups, $C_7$–$C_{10}$ aralkyl groups, $C_5$–$C_{10}$ cycloalkyl group and semi-acetals obtained by reacting said carbonyl compounds with monohydric or dihydric aliphatic alcohols having one to ten carbon atoms in an organic polyhydroxyl compound having a molecular weight of from about 250 to about 14000 as the reaction medium.

5 Claims, No Drawings

AMINOPLAST DISPERSIONS AND POLYURETHANES PREPARED THEREFROM

This is a division, of application Ser. No. 464,099 filed Apr. 25, 1974, now U.S. Pat. No. 4,225,481.

This invention relates generally to polyurethanes and more particularly, to a new process for the preparation of novel dispersions of aminoplasts, and to dispersions which can be obtained by this process and to their use as reaction components for polyisocyanates in the production of polyurethane resins by the isocyanate polyaddition process.

It is known that free N-methylol groups in both low and high molecular weight aminoplast condensates are very readily etherified by alcohols in the presence of catalytic quantities of acids [H. Staudinger and K. Wagner, Makromolekular Chemie, Volume XII, page 173 (1954)]. It is well known that, in the presence of larger quantities of alcohols, such etherification reactions are frequently used commercially for the production of lacquers, e.g. from etherified urea-formaldehyde condensates. The extreme ease of etherification of the urea formaldehyde condensates which contain methylol groups is also very clearly demonstrated by the fact that, when urea is condensed with commercial formaldehyde, which generally contains small quantities of methanol, condensates which contain N-methylol-methyl ether groups of the formula $$—NH—CH_2—OCH_3$$

are obtained in addition to free methylol groups [H. Staudinger and K. Wagner, Makromolekulare Chemie, Volume XII, page 173 (1954)].

According to the findings in the literature quoted above, it is also known that the acidification of solutions of monomethylolurea or monomethylol thiourea or the acidification of freshly prepared solutions of 1 mol of urea and 1 mol of formaldehyde gives rise to polymethylene ureas with a terminal methylol group which has the following composition

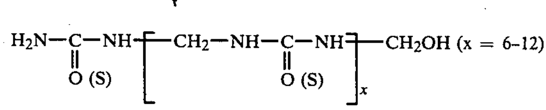

These pulverulent polycondensation products which have the character of pigments generally contain from 6 to 12 urea groups attached by methylene bridges. These pulverulent products can only be dissolved in special solvents, e.g. in concentrated aqueous solutions of magnesium perchlorate, aqueous lithium bromide solutions or solutions of lithium iodide in methanol or acetonitrile.

Even these lower molecular weight compounds, which must be regarded as the simplest representatives or precursors of the generally higher molecular weight aminoplasts are resistant to swelling, are insoluble in organic liquids and cannot be dispersed with known emulsifiers to form stable dispersions. The higher molecular weight representatives of these aminoplasts accordingly manifest the same insolubility and lack of dispersability in organic liquids and dispersions thereof.

It is therefore an object of this invention to provide novel dispersions of aminoplasts. Another object of the invention is to provide a method for dispersing an aminoplast in an organic medium. Still another object of the invention is to provide a dispersed aminoplast suitable for use in the preparation of polyurethane resins by the polyaddition process.

The foregoing objects and others are accomplished in accordance with this invention, generally speaking, by providing stable dispersions obtained by a process wherein ammonia, hydrazine or an organic compound having a molecular weight of from about 50 to about 400 and which contains at least two groups selected from the group consisting of $—NH_2$ and —NH— with benzoquinone or a compound of the formula R—CO—R': in which R and R' stand for the same or different radicals selected from the group consisting of hydrogen $C_1$–$C_4$ alkyl groups which may carry chlorine substituents, $C_2$–$C_4$-alkenyl groups, $C_6$–$C_{10}$ aryl groups. $C_7$–$C_{10}$ aralkyl groups, $C_5$–$C_{10}$ cycloalkyl groups and semi-acetals obtained by reacting said carbonyl compounds with monohydric or dihydric aliphatic alcohols having one to ten carbon atoms in an organic polyhydroxyl compound having a molecular weight of from about 250 to about 14000 as the reaction medium. In spite of these known properties of aminoplasts and in spite of the already previously observed marked tendency of the N-methylol groups temporarily formed during the polycondensation reaction to react with alcoholic hydroxyl groups with the formation of ethers, it has now surprisingly been found that novel finely dispersed dispersions of linear, branched or highly branched and cross-linked aminoplasts in organic polyhydroxyl compounds can be obtained without the hydroxyl content of these polyhydroxyl compounds being changed if the polycondensation reaction which gives rise to the aminoplast is carried out in the polyhydroxyl compound itself as the reaction medium. The resulting dispersions, which are stable indefinitely in storage, are valuable and novel starting compounds for the production of polyurethanes by the isocyanate polyaddition process.

This invention therefore relates to a process for the preparation of aminoplast condensate dispersions in organic polyhydroxyl compounds which is characterized in that the method known per se of preparing aminoplast condensates by the oligocondensation or polycondensation of substances which are capable of aminoplast formation is carried out in an organic polyhydroxyl compound as the reaction medium.

Moreover, the invention provides a method of making polyurethane resins by reacting the novel aminoplast dispersions with an organic polyisocyanate by the isocyanate polyaddition reaction.

The process provided by the invention has the following surprising features:

1. The functionality, e.g. of bifunctional higher molecular weight bis-hydroxyl compounds, is fully preserved during the preparation of finely divided aminoplast dispersions by the process of the invention. According to past experience, one would have expected that, for example, methylolated ureas of the following compositions (a), (b) and (c) would easily etherify as shown in the following equations and split off water in the process, so that the functionality of the polyhydroxyl compound would be partly reduced or reduced to zero.

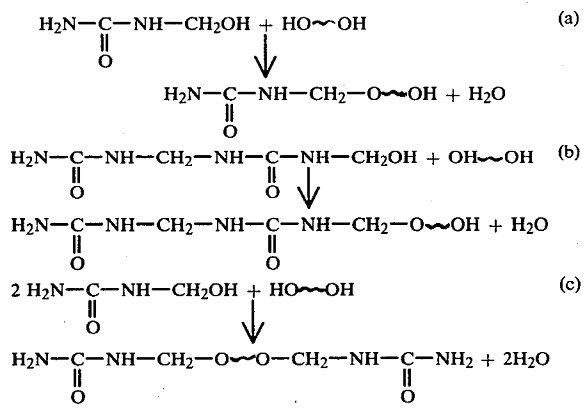

2. According to the invention, extremely stable finely divided aminoplast dispersions in the polyhydroxyl compounds used as the reaction medium are obtained. In view of the difficulties previously encountered in the production of stable aminoplast dispersions in organic liquids, this finding must be regarded as extremely surprising. The dispersions which are provided by the process of the invention are completely stable even at temperatures of about 100° C. Their use as starting components for the production of polyurethane resins makes it possible to produce polyurethanes which are distinguished by numerous remarkable advantages which will be described in more detail hereinafter.

For the purposes of this invention the term aminoplasts means any oligocondensation and polycondensation product which can be obtained in known manner by the oligocondensation or polycondensation of any suitable carbonyl compound, of any suitable carbonyl compound having aforesaid formula preferably formaldehyde with any suitable nitrogen compound as defined hereinbefore which reacts with a carbonyl compound by a process of oligocondensation or polycondensation, preferably by way of intermediate stages which contain N-alkylol groups such as N-methylol groups. Aminoplasts of this kind and the condensation reactions for producing them have already been described, for example in Houben-Weyl, Methoden der organischen Chemie, Volume XIV, part 2 (1963). Georg Thieme-Verlag, Stuttgart, pages 319–402, the disclosure of which is incorporated herein by reference. The term aminoplasts in the context of this invention is also used to include mixed condensates of nitrogen compounds and compounds which are free from nitrogen, in particular phenols or phenol derivatives and carbonyl compounds, in particular formaldehyde, the phenols or phenol derivatives being optionally included in quantities of up to 60% by weight, based on the sum of nitrogen compounds and phenols.

Suitable starting compounds for the process according to the invention also include any nitrogen compounds which are capable of aminoplast formation, e.g. polycarboxylic acid polyamides, urethanes and polyurethanes, ureas, thioureas, biurets, amidines, guanidines, melamines, arylamines, ammonia, especially in combination with quinones such as benzoquinone to form carbonyl compounds, hydrazines, hydrazide and similar nitrogen compounds which are capable of aminoplast formation.

The following are examples of typical representatives of nitrogen containing compounds which are suitable for the process according to the invention: urea, diureas, such as hexamethylene diurea, tetramethylene diurea, ethylene diurea, acetyleneurea, dimethylacetyleneurea, oxalic acid diamide, succinic acid diamide, adipic acid diamide, mono-hydrazides or bis-hydrazides, hydrazodicarbonamide, carbazic acid esters, hydrazodicarboxylic acid esters, monourethanes and particularly diurethanes, for example, the reaction products of aliphatic, cycloaliphatic, araliphatic and aromatic mono-chloroformic acid esters or bis-chloroformic acid esters with ammonia and primary amines, melamine, dicyandiamide, cyanamide, aminoguanidine, dicyandiamidine, guanamines and guanazoles, as well as polyureas of the kind which can be obtained by reacting aliphatic, cycloaliphatic or araliphatic diisocyanates or triisocyanates or biuret polyisocyanates with ammonia or primary amines.

In the process according to the invention, the preparation of the aminoplast dispersions according to the invention is carried out either by reacting the nitrogen compounds given in the examples with carbonyl compounds, in particular with formaldehyde or compounds which split off formaldehyde, or the corresponding compounds which contain N-alkylol groups, preferably N-methylol groups, are used or the corresponding $C_1$–$C_4$ alkylethers of these N-alkylol derivatives either alone or in combination with aldehydes or ketones, in particular with formaldehyde.

Other nitrogen compounds which can be used in addition to aforesaid nitrogen compounds in amounts of up to 50% by weight based on the total amount of nitrogen compounds include higher molecular weight $\alpha,\omega$-diureas and/or their N-methylol compounds and/or N-methylolalkylethers and/or $\alpha,\omega$-bis-alkoxymethylurethanes which contain polyether, polythioether, polyacetal, polyester, polyester amide or polycarbonate residues with average molecular weights of about 400 to about 10,000 between the functional groups in the $\alpha$ and $\omega$-positions and which may also contain urethane or substituted urea groups. These higher molecular weight nitrogen compounds may be reacted together with the low molecular weight nitrogen compounds already mentioned above. The higher molecular weight nitrogen compounds capable of aminoplast formation which are particularly advantageous for this purpose are water-soluble or water dispersible compounds, e.g. compounds which contain polyethylene oxide groups or residues of copolymers of ethylene oxide with propylene oxide or tetrahydrofuran or of water-soluble polyacetals prepared from diethylene glycol, triethylene glycol or tetraethylene glycol and formaldehyde between the functional groups in the $\alpha$ and $\omega$-positions.

Although these nitrogen compounds already mentioned above which are capable of aminoplast formation and the corresponding low molecular weight N-methylol compounds are the preferred starting materials for carrying out the process of the invention, it may be preferable to modify these starting materials with other compounds, e.g. compounds which are capable of formaldehyde condensation, because it may then be possible to control the bond strength and physical properties of the diisocyanate polyaddition products produced from them, such as their hardness, tendency to swell, water retention capacity, resistance to rotting, resistance to oil and petroleum hydrocarbons, water absorption capacity and biocidal, bactericidal and fungicidal resistance or activity as required for their intended use. The following are examples of such compounds which can be easily and rapidly incorporated by mixed condensation: polyurethanes and polyureas which contain amino end groups, polyamides of poly-($\beta$-alanine) which have molecular weights of up to 2000, N-methylolmethyl ethers of polycaprolactam, polythiolactams, polypeptides of N-carboxy-$\alpha$-aminocarboxylic acids, low molecular weight polyamides of aliphatic dicarboxylic acids and diamines, polyamides and cycloaliphatic components and aromatic components, polyamides which contain O— or S— or N— as heteroatoms, polyester amides, mixed condensates which contain ester, urethane or urea groups in addition to amide groups, ethoxylated and propoxylated monoamides and polyamides, polyhydrazides and polyaminotriazoles, polysulphonamides, phenol-formaldehyde mixed condensates with urea, melamine and dicyandiamide, low molecular weight anilineformaldehyde condensates, sulphonic acid amides, mononitriles and dinitriles, acrylonitrile, urotropin, hexahydrotriazines of primary amines and formaldehyde, Schiff's bases and ketimines or polyketimines, e.g. those obtained from 1 mol of hexamethylenediamine and 2 mols of cyclohexanone, polyaddition products and polycondensation products of melamine and other aminoheterocyclic compounds with aldehydes and alcohols, polyaddition and polycondensation products of nitriles with aldehydes, reaction products of phosphorous acid and phosphine with carbonyl compounds. The incorporation of stilbene compounds containing groups which tend to form N-methylol groups, and other brightening agents, for example, those which contain an unsubstituted sulphonamide group in their molecule, may also be advantageous in proportions of up to 0.5% to 20% by weight. The following should also be mentioned: 1,3,5-tri-(4'-sulphamyl-phenyl-amino)-triazine, melamine-mono-methylene acrylamide, ureido and thioureido compounds containing a substituted or unsubstituted vinyl group and an alkylated methylol group (German patent specification No. 1,018,413), N-cycloalkyl-N'-dialkylureas, alkylene ethers of salicylic acid amide, benzene sulphonamide, reaction products of methoxymethylisocyanate with mono-, di- and polyamines, carbaminyl amides according to German patent specification No. 943,329, N-di-carboxylic acid monoureides, esters of $\alpha$-oleiine-N-dicarboxylic acid monoureides according to German patent specification No. 1,005,057 addition products or condensation products of carbonyl compounds and hydrazine carboxylic acid esters, 2-hydrazino-4,6-bis-diethylamino-1,3,5-triazine, monomethoxydihodanotriazine, ethylaminodirhodanotriazine, substituted acid hydrazides of isopropylhydrazine and stearic acid, 2-aminothiazole, 2-aminotriazole, dichloromaleicimide, reaction products of 1 mol of methoxymethylisocyanate and 1 mol of trimethylolaminomethane, addition or condensation products of N-carbonyl-sulphamic acid chloride with ammonia or a primary amine, maleic acid hydrazide, hydrazodicarboxylic diethylester, hydrazodicarbonamide, hydroxyethylurethane, phenyl hydrazine, bis-biguanides, aminoguanidine, disodium ethylene bisdithiocarbamates, phosphoric and phosphorous acid amides, acylaminoguanidine, benzoyldicyandiamide, 1,3-disubstituted 5-amino-1,2,4-triazoles according to German patent specification No. 1,241,835 and maleic acid monoamides. Polyureas which can be obtained by the action of ammonia and monoamines on isocyanatoarylesters of phosphoric, thiophosphoric, phosphonic or thiophosphonic acids according to German patent specification No. 1,129,149. Mixtures of 1,3-dimethylol-5-alkylhexahydro-1,3,5-triazone-(2) and methylolureas according to German patent specification No. 1,133,386, the condensation products of dicyandiamide and nitriles such as 2,6-diamino-4-phenyl-1,3,5-triazine (benzoguanamine), isobutylidene-diurea, $\alpha$-chloroisobutylidene-diurea, methacrylamido-benzene sulphonic acid-(N-methanesulphonyl)-amide, dimethylolglyoxal monoureine, dithioureas which can be obtained by reacting ammonia or primary amines with isothiocyanates according to German patent specification No. 1,241,440; isourea ether and isobiuret ether derivatives (German patent specification No. 1,240,844), cyanosubstituted aliphatic ureas which can be obtained by reacting ammonia with cyanosubstituted aliphatic isothiocyanates according to German patent specification No. 1,121,606, low molecular weight mixed condensates of melamine, urea, dicyandiamide and thiourea, methylolated polyureidopolyamides which can be obtained according to German patent specification No. 1,034,857 by reaction of $\epsilon$-caprolactam with diethylenetriamine followed by urea condensation and formaldehyde addition. The following should also be mentioned: aminoplast resins of dicyandiamide, formaldehyde and formic acid according to German patent specification No. 1,040,236 condensation products of primary amines, epichlorohydrin and urea, condensation products which can be obtained by reacting sulphomethylated phenols and monomethylolurea, dimethylolurea or trimethylolurea or methylol compounds of acid amides, ethoxylation products of diethylene triamine, water-soluble hexamethylolmelamine condensates and their reaction products with epichlorohydrin, low molecular weight urea-phenol mixed condensates, N,N'-dimethylolurone, methylene-bis-methylolurone-methylether, melamine- and ammeline-mixed condensates. Condensation products of trimethylolphosphine oxide and methylolmelamine, mixed condensates of melamine, formaldehyde and polyamines such as can be prepared according to German patent specification No. 1,059,659, mixed condensates which contain methylol groups and have been obtained from 1 mol of benzoguanamine, 3 mols of melamine and 5 mols of formaldehyde, mixed condensates of dicyandiamide and naphthalene sulphonic acids which have been condensed with formaldehyde, water-soluble condensation products of trimethylol and tetramethylol melamine which may be modified with other compounds which are capable of aminoplast formation; mixed condensates of melamine urea, guanidine, dicyandiamide, formaldehyde and diethylmalonate, which mixed condensates contain methylol groups; water-soluble, resinous condensation products of 1 mol of urea and 1 or 2 mols of acrylic acid or methacrylic acid; alkylene dimelamines which can be obtained by reacting dicyandiamide with cyanoaminonitriles in the presence of potassium hydroxide; condensation products of monomethylolurea, and dimethylolurea or thiourea with glyoxal; modified carbamide methylolethers in accordance with German patent specification No. 1,017,787, e.g. those obtained from urea, melamine, butanol and methacrylic acid; reaction products of formaldehyde condensation products of compounds of the aminotriazine or urea series which contain free N-methylol groups with nitriles or amides of unsaturated polymerizable or copolymerizable acids which are prepared according to German patent specification No. 1,005,270; vinyl oxyalkylmelamines which contain methylol groups; methylol compounds of reaction products of diisocyanates with 1 mol of ethylene imine and 1 mol of ammonia or primary amines; methacrylamide- and acrylamide-methylol methylether; methylol compounds of N-vinyl derivatives of N,N'-alkylated cyclic ureas such as N-vinyl-N,N'-ethylene urea; methylol compounds of amides of phosphoric and thiophosphoric acid; methylol compounds of biguanides; methylol-containing addition products of carbamic acid esters and glyoxal, methylol-containing mercapto fatty acid hydrazides obtained from methylthioglycollate and hydrazine; formamide; tertiary butyl formamide; polyureas obtained from tetraethylenepentamine and urea; methylol-containing quaternary ammonium derivatives of aminoacetoguanamine according to German patent specification No. 1,032,259; N-methylol compounds of biuret or N-alkylated biuret derivatives; benzene sulphoallylamide; methanesulphoallylamide; dimethylaminosulphoallylamide; methylol compounds of hydantoin and derivatives; methylol compounds of salicyclic acid amides, such as 5-chloro-2-oxy-benzene-1-carboxylic acid-n-amylamide; dichlorophenoxyacetic acid amides; 2-amino-4-(ethylthio)-butyric acid; 2-amino-4-methoxybutyric acid; 2-amino-4-(methylsulphonyl)-butyric acid which is active against fungi, viruses, bacteria and other parasitic organisms and which can be fixed in the products of the process by formaldehyde condensation; methylol compounds of low molecular weight condensation products of cyclic lactim-O-alkylethers such as butyrolactim ether, valerolactim ether or caprolactim ether with monoacylated hydrazines or urea, thiourea, bishydrazides and semicarbazide.

In the process according to the invention, the above mentioned higher molecular weight nitrogen compounds which are capable of aminoplast formation may advantageously be used in a quantity of 0 to 40 percent by weight, based on the quantity of low molecular weight compounds which are capable of aminoplast formation.

Among the substances capable of aminoplast formation which are suitable for the process according to the invention may also be included e.g. polyfunctional N-formyl compounds or acetyl compounds, e.g. those of hydrazine, N-methylhydrazine, N,N-dimethyl- and diethylhydrazine, ethylenediamine, trimethylenediamine, 1,2-diaminopropylene diamine, tetramethylenediamine, N-methyl-propylene-1,3-diamine, pentamethylene diamine, trimethylhexamethylenediamine, hexamethylenediamine, octamethylenediamine, undecamethylenediamine, diaminomethylcyclobutane, 1,4-diaminocyclohexane, 1,4-diamino-dicyclohexylmethane, 1-methyl-2,4-diamino-cyclohexane, 1-methyl-2,6-diamino-cyclohexane, m-xylylenediamine, 1-amino-3,3,5-trimethyl-5-aminomethyl-cyclohexane, p-aminobenzylamine, 3-chloro-4-aminobenzylamine, hexahydrobenzidine, 2,4-dichloro-1,4-diaminobenzene, p-phenylenediamine, tolyene-2,4-diamine, 1,3,5-triisopropylphenylene 2,4-diamine, 1,3,5-trimethylpheylene-2,4-diamine, 1-methyl-3,5-diethyl-phenylene-2,4-diamine, 1-methyl-3,5-diethylphenylene-2,4-diamine, 4,4'-diaminodiphenylmethane and 4,4-diaminodiphenylether.

The formylated polyamines mentioned above are valuable compounds capable of aminoplast formation even in the nonacylated state, i.e. as free polyamines, since in this form they can be reacted in particular with formaldehyde to form highly cross-linked polyhexahydrotriazine dispersions.

In preparing the dispersions according to the invention it has been found particularly valuable to add 0.5% to 30% by weight, based on the total quantity of aminoplast forming starting compounds, of chain breaking agents, that means, substances which terminate the molecular chain which have not hitherto been known, in particular lactams such as ε-caprolactam, valerolactam, butyrolactam and the corresponding thiolactams. However, other monofunctional compounds may also be used for chain breaking reactions to control the viscosity properties of the dispersions, for example formamide or acetamide.

The preferred chain breaking agent used is ε-caprolactam. When preparing polymethyleneureas, for example, it is possible with the aid of ε-caprolactam to obtain polymer homologous series of polycondensates which are linked by methylene groups and have terminal lactam units. These polycondensates correspond to the following formula

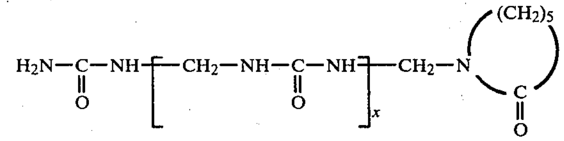

in which X=4 to 20.

For regulating the chain length, e.g. in the case of polymethyleneurea, polymethylenethiourea and polymethylene melamine dispersions, which are the ones preferably prepared according to the invention, as well as the corresponding dispersions which are cross-linked with excess formaldehyde, it may also be advantageous to use 0.5% to 30% by weight, based on the quantity of solids in the dispersion, of the following compounds as chain breaking agents: 2,4-dichlorophenyoxyacetic acid amides, e.g. the N-methylamide, N-ethylamide, or N-butylamide; 2-methyl-4-chlorophenoxyacetic acid and its amide and N-substituted amides; 4-(2,4-dichlorophenoxy)-butyric acid, trichloroacetic acid amide; 2,2-dichloropropionic acid; 2,2-dichloropropionic acid amide; the N-methylol compounds of 2,2-dichloropropionic acid amide; the N-methylolmethylether of 2,2-dichloropropionic acid amide, chloroacetic acid diallylamide; urethanes such as N-(3-chlorophenyl)-carbamic acid isopropyl ester; N-(4-chlorophenyl)-N,N'-dimethylurea; and urethanes obtained by reacting aromatic isocyanates which may contain several chlorine atoms with isopropanol or by reacting methyl isocyanate with isopropanol. The incorporation of halogenated triazines such as 2-chloro-4,6-bis-ethylamino-s-triazine and of formyl compounds of aminoguanidine is also suitable; also imidazoles, 2-methylimidazole, benzimidazole and mercaptobenzimidazoles; the following should also be mentioned: 3-amino-triazole, N-cyclohexyl-N'N'-dimethylurea, disodium ethylene-bis-dithiocarbamate, 5-chloro-2-hydroxybenzene-1-carboxylic acid n-amylamide, the methylol compound of 5-chloro-2-hydroxybenzene-1-carboxylic acid amide, and N-methylol compounds which can be obtained by reacting the chloroformic acid ester of hexachloroisopropanol with ammonia and subsequently with formaldehyde.

Any compounds which contain only one of the groups which take part in the condensation reaction leading to aminoplast formation are in principle suitable for use as chain breaking agents. Adjustment of the viscosity of the products of the process can easily be controlled by using these chain breaking agents mixed with the higher functional nitrogen compounds.

In a particular embodiment of the process according to the invention, compounds which, in addition to containing groups which are capable of aminoplast formation, also contain groups (e.g. chromophoric groups) which impart the properties of dyes and/or brightening agents to these starting materials are included in quantities of 0.5% to 20% by weight, preferably 2% to 14% by weight, based on the total quantity of aminoplast forming starting compounds. By incorporating these compounds, it becomes possible to produce colored dispersions with extremely stable colors, and these color properties are carried over into the polyurethane resins which are produced from these dispersions.

Brightening agents of the following composition are examples of such compounds:

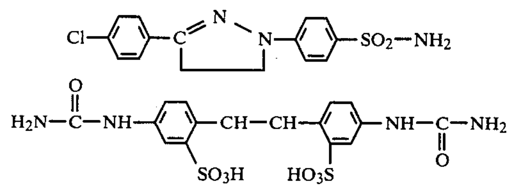

as well as numerous dyes which have fluorescent properties such as those mentioned in Examples 10 and 13.

In the process of aminoplast formation according to the invention, the starting materials mentioned above, insofar as they do not yet contain a sufficient number of reactive alkylol and/or alkylol ether groups for the polycondensation reaction, are first reached with carbonyl compounds, i.e. in particular aldehydes or ketones such as formaldehyde, acetaldehyde, butyraldehyde, cyclohexane aldehyde, benzaldehyde, salicyclic aldehydes, 4-methylbenzaldehyde, terephthalic dialdehyde, acetone, diethylketone, cyclohexanone or benzophenone or also quinones such as benzoquinone as reactants for ammonia.

The reactant used in the process according to the invention for the reaction with the above mentioned starting compounds which preferably contain nitrogen is preferably formaldehyde in the form of an aqueous solution or in the gaseous form of any compounds which split off formaldehyde or react like formaldehyde such as its semiacetals with monofunctional or polyfunctional alcohols such as methanol, ethanol, butanol, ethylene glycol, or diethylene glycol, etc.; or acetaldehyde, chloral, acetone, methyl ethyl ketone, methyl isobutyl ketone or cyclohexanone. Aqueous formaldehyde is particularly preferred.

In addition to the above mentioned compounds which are preferred for aminoplast formation, substances which are capable of so-called phenoplast formation may also be added, as explained above, in quantities of 0.5% to 50% by weight, preferably 5% to 40% by weight, based on the total quantity of aminoplast forming starting compounds, for the purpose of modifying the dispersions according to the invention. These modifying compounds do not reduce the condensation velocity. They are capable of substantially modifying the aminoplast dispersions and enable the viscosity properties of the dispersions according to the invention to be controlled. Among the compounds which are capable of phenoplast formation, the following are preferred: phenol, bisphenol, resols of phenol or bisphenol and formaldehyde, condensation products of phenol and cyclohexanone, phenolsulphonic acids, naphthalene sulphonic acids and the like.

When carrying out the process according to the invention, aminoplast formation may be activated if desired with the aid of any known condensation catalysts, e.g. formic acid, hydrochloric acid, sulphuric acid, phosphoric acid, acetic acid, thioacetic acid or maleic acid and, of course, also bases such as sodium hydroxide, potassium hydroxide, calcium hydroxide, barium hydroxide, zinc oxide, nagnesium oxide, phosphoric acid, phosphates, primary and secondary potassium hydrogen phosphate, ammonium sulphate, numerous organic acid anhydrides, and the like, compounds which split off acids, such as ammonium chloride, trimethylammonium formate, chloral hydrate, amine salt of formic acid and other organic carboxylic acids, maleic acid semiesters, tertiary amine salts, etc., dibenzoyl peroxide, carbonic acid, N-carbamic acids, glycol chlorohydrin, glycerol chlorohydrin, epichlorohydrin and various copper, zinc, divalent tin, cadmium and magnesium salts of organic acids. Various metal oxides or their hydrates may also be used.

The activators preferably used in the process according to the invention are hydrochloric acid, sulphuric acid, phosphoric acid, formic acid, maleic acid, sodium hydroxide, potassium hydroxide, barium hydroxide, benzyldimethylamine and triethylamine.

The activators are generally used in quantities of from 0.05 percent to 5 percent by weight, preferably 0.1 percent to 2 percent by weight, based on the total quantity of all reactants taking part in the polycondensation.

The process according to the invention may be carried out in any suitable organic polyhydroxyl compound as the reaction medium. Suitable polyhydroxyl compounds for the process according to the invention are in particular the higher molecular weight polyhydroxyl compounds known in polyurethane chemistry to react with an organic polyisocyanate to form a polyurethane resin and having a molecular weight of about 250 to about 14,000, preferably about 400 to about 6000. These may if desired, be used as mixtures with low molecular weight polyhydroxyl compounds which have molecular weights of about 62 to about 250. These low molecular weight polyhydroxyl compounds may be included in quantities of from about 5% to about 50% by weight.

Suitable higher molecular weight polyhydroxyl compounds are in particular hydroxyl polyalkylene ethers which contain at least two terminal hydroxyl groups and in which preferably at least 10% of the hydroxyl groups are primary hydroxyl groups. Polyethers of this kind can be prepared in known manner by reacting suitable starter molecules with alkylene oxides such as ethylene oxide alone, or propylene oxide, butylene oxide, styrene oxide or epichlorohydrin or mixtures of these compounds first and then with ethylene oxide to provide terminal primary hydroxyl groups.

Any suitable initiator may be used in making the polyethers such as, water, ethylene glycol, diethylene glycol, polyethylene glycol, propane-1,2-diol, propane-1,3-diol, butane-1,4-diol, hexane-1,6-diol, glycerol, hexane-1,3,6-triol, trimethylolpropane, aliphatic or aromatic polyamines, e.g. ammonia, methylamine, ethylene diamine, tetramethylene diamine or hexamethylene diamine, diethylene triamine, ethanolamine, diethanolamine, methyl diethanolamine, triethanolamine, toluidine paraphenylenediamine, 2,4-diaminotoluene, 2,6-diaminotoluene and the like.

The preferred polyols having more than two hydroxyl groups are basically any polyols taken from the series of polyethers based on propylene oxide, ethylene oxide or their copolymers, their polyadditon products with difunctional or higher functional polyols such as trimethylolpropane, glycerol, sugar alcohols, such as sorbitol, pentaerythritol, mixtures of these compounds or copolymerization products, e.g. of ethylene oxide and propylene oxide with cyclohexane oxide, styrene oxide, tetrahydrofuran, trioxane and cyclic acetals such as 1,3-dioxolan, ring acetals of diethylene glycol and triethylene glycol or thiodiglycol, and the like; propoxylated or cyanoethylated monoamines, polyamines, polyketimines and aldimines, their hydroxymethylation, hydroxyalkylation and propoxylation products and reaction products obtained by reacting these compounds with a sub-equivalent amount of polyisocyanates, which reaction products have only been lengthened to form short chains (polyols which contain urethane groups and urea groups).

Among the particularly preferred polyethers, those which are of special interest are the polyethers of propylene oxide which contain a certain proportion of ethylene oxide segments, either in the form of mixed blocks or statistically distributed or, preferably, as terminal segments, and which also contain primary hydroxyl groups and end groups. These polyethers may contain up to 70% by weight and more of polyethylene oxide segments. Based on the quantity of propylene oxide segments built into them, they preferably contain about 13 percent to 30 percent by weight of polyethylene oxide segments. Higher melting, pure polyethylene oxide with average molecular weights of about 500 to about 6000, for example, may also be used to advantage for producing the aminoplast dispersions. The dispersions obtained in this case are higher melting spread coating pastes which contain the aminoplast in a highly disperse form. Eminently suitable for this purpose are, for example, the addition products of propylene oxide with trimethylolpropane which are reacted with ethylene oxide in a second phase in such a manner that about 17 parts to 13 parts by weight of bound ethylene oxide are obtained for every 83 parts to 87 parts by weight of bound propylene oxide, the resulting polyhydroxyl compounds having average molecular weights e.g. of about 1500 to about 4900, a trimethylolpropane content of about 2 to about 3 percent by weight and a hydroxyl number of about 35 to about 20. Polyhydroxyl compounds of this kind are particularly suitable for preparing aminoplast dispersions (which may be modified) which can be reacted with polyisocyanates to produce highly elastic foams.

Higher functional polyhydroxyl compounds from the series of polyethers which have substantially higher hydroxyl numbers are also of great interest for the process according to the invention. Used in combination with aminoplasts, they are particularly suitable for producing semi-rigid and rigid foams by the diisocyanate polyaddition process. These polyhydroxyl compounds are in particular addition products of propylene oxide and trimethylolpropane with hydroxyl numbers of about 375 to about 850 and addition products of propylene oxide and sucrose-trimethylolpropane mixtures with hydroxyl numbers of about 400 to about 350.

Apart from the polyethers referred to above, the process according to the invention may, of course, also be carried out using the polyhydroxypolyesters, polyhydroxypolyacetals, polyhydroxypolyesteramides and polyhydroxypolycarbonates already known in polyurethane chemistry as well as any urethane containing polyols, provided that they are liquid under the reaction conditions. Suitable polyhydroxy compounds of these kinds are disclosed, for example, in Polyurethanes: Chemistry and Technology, by Saunders and Frisch, published by Interscience Publishers, the disclosure of which is incorporated herein by reference.

Apart from the above mentioned polyethers which are particularly preferred, polyhydroxypolyesters within the above mentioned molecular weight range are also frequently used in the process according to the invention. Thesepolyhydroxypolyesters are prepared in known manner by the polycondensation of polycarboxylic acids such as adipic acid, sebacic acid, phthalic acid or terephthalic acid with polyols such as ethylene glycol, diethylene glycol, tripropylene glycol, trimethylolpropane, glycerol or the like.

In the process according to the invention, the higher molecular weight polyhydroxyl compounds may, as described above, be used as mixtures with low molecular weight polyhydroxyl compounds of the types mentioned as examples for the preparation of polyesters.

To carry out the process according to the invention, the reactants, preferably dissolved in water, may be mixed with the polyhydroxyl compounds, and polycondensation may then be initiated by heat and/or acid or basic catalysts with the removal of water. Organic solvents may be used for azeotropic removal of the water if desired, although it is preferred to work without solvents. The most advantageous method, however, comprises adding the aminoplast forming aqueous reactants in small portions to the polyhydroxyl compounds and continuously removing water by distillation, the process being carried out in such a way that about 0.3 to about 2.5 equivalents of carbonyl compound are used per amino equivalent of the reactant which is capable of aminoplast formation. It is particularly preferred to carry out the polycondensation by adjusting the polyhydroxyl compounds to an acid pH, e.g. pH 1 to 3. The reaction then progress extremely rapidly, and formation of the dispersions takes place continuously as soon as the reactants are dripped into the polyhydroxyl compounds.

The aminoplast or modified aminoplast dispersions according to the invention can easily be prepared, e.g. by condensing the above mentioned compounds which are capable of aminoplast formation with the carbonyl compounds, preferably formaldehyde, in the presence of the catalysts mentioned above in a neutral, basic or acid medium at a temperature of about 0° C. to about 200° C., preferably about 20° C. to about 100° C., the reactants being used in such proportions that from about 0.3 to about 2.5 equivalents of carbonyl compound enter into the reaction for every amino equivalent of the reactant which is capable of aminoplast formation. The wide variety in the structure of the dispersions which can be obtained by this method is substantiated by examples. According to a preferred method of carrying out this process, the reactants are preferably first dissolved in water or a lower alcohol, and the resulting reactive solutions, in which an equilibrium becomes established between the starting compounds and the N-methylol products, are introduced dropwise at about 40° C. to 80° C. into the polyhydroxyl compound which may e.g. be adjusted to acid, introduction of the solution being accompanied by stirring and removal of the water under vacuum. Alternatively, the above mentioned reaction mixtures or solutions of partly methylolated products or already partly precondensed but still soluble polymethylol compounds, e.g. of urea, may be added to the polyhydroxyl compound all at once and condensation may then be completed by heating at a basic or acid pH while the water is removed at normal pressure or under a vacuum. The acids or bases used as catalysts should generally be inactivated by inorganic or organic bases or acids after the preparation of the dispersions. The following are dispersions which are preferably prepared by the last mentioned process: aminoplast dispersions of formaldehyde and urea, thiourea, melamine, hexamethylene diurea, dispersions of formaldehyde and mixtures of urea and thiourea, dispersons of formaldehyde and mixtures of urea and melamine or dicyandiamide or of formaldehyde and mixtures of urea with hydrazodicarbonamide, etc.

The solids content of the dispersions may be varied within wide limits and is generally about 0.5 percent to about 80 percent by weight, preferably about 5 percent to about 45 percent by weight, based on the total weight of the dispersions.

The dispersions obtained in this way are high quality starting materials for the production of polyurethane resins, in particular polyurethane foams, by the isocyanate polyaddition process. When producing the foams, the dispersions according to the invention are used instead of or as mixtures with the polyhydroxyl compounds normally used in polyurethane foam chemistry. The aminoplasts dissolved in the dispersions substantially increase the flame resistance and solvent resistance of foams produced from them.

Production of polyurethane foams with the aid of the dispersions according to the invention is preferably carried out by the so-called one shot process, advantageously with the aid of the mechanical devices described e.g. in U.S. Pat. No. Re. 24,514 and using the procedure described in German patent specification No. 881,881.

The organic polyisocyanates used for preparing the polyurethanes and in particular polyurethane forms in accordance with the invention may be those already known per se, e.g. aliphatic, cycloaliphatic, araliphatic and aromatic polyisocyanates of the kind disclosed in the aforesaid book written by Drs. Saunders and Frisch.

The polyisocyanates preferably used in accordance with the invention are polyphenyl-polymethylene polyisocyanates which can be obtained by aniline-formaldehyde condensation followed by phosgenation, and mixtures of these polyisocyanates with tolylene-2,4-diisocyanate and/or 2,6-diisocyanate, optionally mixed with 4,4'-diphenylmethanediisocyanate and its isomers.

Other polyisocyanates which are also preferred for the process according to the invention include solutions of so-called modified polyisocyanates, i.e. polyisocyanates which contain biuret, allophanate, urethane or isocyanurate groups which are dissolved in the above mentioned monomeric polyisocyanates; these have long been known in the art. The preparation of these modified polyisocyanates is known per se. The solutions of modified polyisocyanates which are preferred for the invention generally contain from about 5% to about 70% by weight, preferably about 10% to about 50% by weight, of modified polyisocyanate.

When producing the foams from the dispersions according to the invention, fillers known flame-retarding agents, additives and inorganic fillers of various kinds may, of course, also be included, in particular, for example, watersoluble or water dispersible inorganic salts, double salts or complex comounds such as ammonium sulphate, spent liquors which still contain ammonium sulphate from the preparation of caprolactam, calcium sulphate, $(NH_4)_2SO_4.H_2O$. $Ca(H_2PO_4)_2$, ammonium phosphate, $CaNaPO_4.Ca_2SiO_4$, $5CaO.P_2O_5.SiO_2$,$Ca_4P_2O_5$,$(CaMg)O.Al_2O_3.4SiO_2$,$Al_2O_3.2SiO_2.2H_2O$, $KCl.MgSO_4.3H_2O$, $K_2SO_4.MgSO_4.6H_2O$, $Si_2O_6AlK$, sodium nitrate, ammonium nitrate, secondary sodium ammonium phosphate and the like. Many of the inorganic compounds mentioned above often have a catalytic effect on foam formation, especially at elevated temperatures and moreover the inorganic salts which can be used in considerable quantities (up to 50 percent by weight, based on the total weight of the foam) when the dispersions produced by the process according to the invention are used as starting materials for the production of polyurethane foams also increase the flame resistance.

The use according to the invention of dispersions prepared by the process of the invention, is of course, not restricted to the production of polyurethane foams. The dispersions provided by the invention may in fact completely or partly replace the polyhydroxyl compounds commonly used for producing polyurethane elastomers, polyurethane lacquers or polyurethane leather coating compounds and they may also replace polyurethanes in other fields.

Summarizing, the process according to the invention for producing aminoplast dispersions and the use of these dispersions as starting materials for producing polyurethane resins have the following advantages:

1. Although the high reactivity of formaldehyde with hydroxyl compounds in accordance with the following reaction

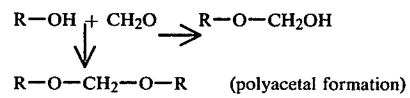

$$R-OH + CH_2O \rightarrow R-O-CH_2OH$$
$$\downarrow$$
$$R-O-CH_2-O-R \quad \text{(polyacetal formation)}$$

readily leads to the formation of etherified N-methylol compounds or polyacetal, the hydroxyl functionality of the polyhydroxyl compounds is substantially unaffected by the process according to the invention.

2. Aminoplasts can, therefore, be obtained in a finely dispersed and indenfinitely stable form in any polyhydroxyl compounds, e.g. polyethers and/or polyesters while at the same time the functionality of the polyhydroxyl compounds is completely preserved.

3. The wide variability in the compounds capable of aminoplast formation and in the carbonyl components without affecting the hydroxyl functionality of the products of the process makes it possible for the properties of the dispersions to be widely varied. In particular, the viscosity of the dispersions according to the invention, which is generally about 800 to about 50,000 cP at 25° C., can easily be adapted for any particular purpose by using the above mentioned chain breaking agents.

4. The dispersions according to the invention are eminently suitable for use in the preparation of elastomers by the casting process, polyaddition products with improved flame resistance and light fastness being obtained.

5. Microporous coatings or films as well as lacquers and coatings which have a strong matting effect can be produced by the diisocyanate polyaddition process.
6. Leather-like materials which have a high water absorption capacity can be produced from the dispersions according to the invention.
7. Foams with very substantially increased flame resistance can be produced. In the case of fire, they have a much lower density of fumes compared with conventional foams and show no tendency to spread the flames.
8. The aminoplast dispersions according to the invention are also excellent reaction components for carrying out matrix reactions by the methods indicated in German Offenlegungsschriften Nos. 1,911,643; 1,911,644; 1,911,645 and 1,953,347.

The parts given in the following examples are parts by weight in grams unless otherwise indicated. Parts by volume represent $cm^3$.

EXAMPLE 1

(a) The polyether of this example which was used as the reaction medium for preparing aminoplast dispersions according to the invention was prepared as described below and has the composition indicated below:

Polyaddition of propylene oxide was first carried out in the presence of catalytic quantities of sodium alcoholate, using trimethylolpropane as starter. Ethylene oxide was then polyadded in the second phase. The liquid polyether contains primary hydroxyl groups, and the polyadded propylene oxide and ethylene oxide are present in proportions by weight of 83:17. The polyether used has a hydroxyl number of about 35. The viscosity of the polyether is 870 cP at 20° C.

(b) Preparation of the aminoplast dispersions according to the invention

16926 Parts of the polyether described under (a) are introduced into a 40 liter VA vessel, heated to 50° C. with vigorous stirring and freed from traces of oxygen with a water jet vacuum. The stirrer vessel is flushed repeatedly with nitrogen. The polyether is free from oxygen within 30 minutes. 368 Parts of aqueous normal hydrochloric acid are then added all at once, again under nitrogen. The polyether provided with acid catalyst remains water-clear. The reaction vessel is now evacuated and a freshly prepared filtered solution of 2760 parts of urea (46 mol), 4600 parts of 30% formalin solution (46 mol) and 920 parts (8.14 mol) of $\epsilon$-caprolactam is introduced dropwise over a period of 135 minutes at about 50° C. The above mentioned reaction mixture is continuously added (total time 2.25 hours) at the rate that water is removed by distillation under vacuum. Stirring is then continued for another ½ hour and the reaction mixture is then immediately neutralized with 368 parts of normal sodium hydroxide solution. This neutralization is carried out under an atmosphere of nitrogen. After neutralization, residual quantities of water are removed at 5 mm Hg and 90° C. Altogether about 4716 parts of water are removed and residual quantities of water are eliminated by briefly heating under a vacuum at 100° C. A clear white, stable dispersion of polymethylene ureas of the following general formula are obtained:

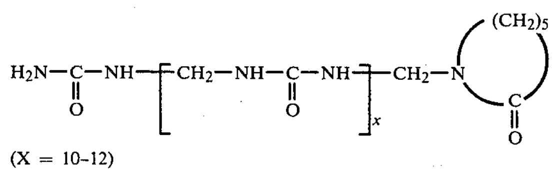

(X = 10-12)

This dispersion has a solids content of about 20 percent by weight. Yield: 20,867 parts of aminoplast dispersion. The stable dispersion has a viscosity of 7940 cP at 25° C., and when tested over a period of six months it is always found to be completely stable both at room temperature and at 50° C. A small quantity of salt formed by neutralization can be left in the dispersion as it has no deleterious effect on the properties.

(c) Evidence of the constant functionality of the polyether used as dispersing agent:

1000 Parts by volume of acetone are added to 100 parts of the dispersion. The mixture is vigorously stirred with 200 parts of active charcoal and then centrifuged. The centrifuged solution, which contains the polyether, is freed from acetone under vacuum. The liquid polyether residue is colorless and water clear. The polyether has a hydroxyl number of 34.2 and the reaction has not altered the polyether originally put into the test (hydroxyl number 35) either by acetal formation or by formation of condensed low molecular weight urea methylol ethers. The polycondensation according to the invention has therefore been carried out with substantial preservation of the functionality of the polyether used since the polyether does not contain any condensates either of formula

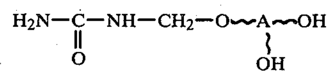

or of formula

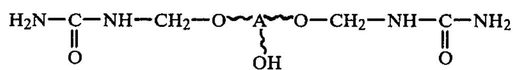

(A stands for a radical obtained by removing the hydroxyl groups from the polyether)

EXAMPLE 2

The procedure is the same as that described in Example 1(b) except that the urea formaldehyde solution is kept for 30 minutes in the presence of 20 parts of N-potassium hydroxide solution at 40° C. before the polyether is added. Vigorous methylolation of the urea sets in at this stage. The procedure is then continued exactly as described in Example 1(b) but using 388 parts of normal hydrochloric acid as catalyst. After polycondensation and neutralization carried out as in Example 1(b), a stable, white dispersion which can be stored indefinitely and in which the hydroxyl number of 34.2 of the polyether is practically unchanged, is obtained.

EXAMPLE 3

This example is carried out as described in Example 1(b) but with only 1/100 the quantities, in other words 169.3 parts of the polyether of the composition described in Example 1(a), 27.6 parts of urea, 46 parts of 30% formalin solution and 9.2 parts of ε-caprolactam. In this case, however, 3 parts of ammonium chloride, 4 parts of ammonium sulphate and 1.5 parts of sodium ammonium phosphate are added to the urea formaldehyde solution as catalysts with vigorous stirring. After polycondensation, a very stable dispersion is obtained which is practically non-inflammable and can be foamed to produce excellent foams with extremely high flame resistance.

EXAMPLE 4

This example is carried out exactly as described in Example 1(b) but with only one tenth of the quantities, that is to say 1693 parts of the polyether with the composition described in Example 1(a), 276 parts of urea, 460 parts of 30% formalin solution and 92 parts of ε-caprolactam, and in addition 20 parts of a higher molecular weight α,ω-diurea-diurethane polyether as elasticizing urea. This bis-urea was prepared by reacting 1 mol of an α,ω-dihydroxypolyethylene glycol which had an average molecular weight of 2000 with 2 parts of hexamethylene diisocyanate and then reacting the isocyanate prepolymer with 2 mols of ammonia.

After polycondensation carried out under the conditions indicated in Example 1(b) a stable, aqueous dispersion is obtained which is eminently suitable for producing difficulty inflammable, highly elastic foams by the diisocyanate polyaddition process.

EXAMPLE 5

This example is carried out as described in Example 4 but in addition hot solutions of 1 mol of trimethylolmelamine and 2 mols of dicyandiamide are added during the condensation process. After processing as described in Example 4, stable, cross-linked polymethylene ureas which have been modified by melamine and dicyandiamide condensation are obtained. The white dispersions obtained are completely stable and eminently suitable for producing flame resistant, highly elastic foams by the diisocyanate polyaddition process because the functionality of the polyether has not been changed.

EXAMPLE 6

This example is carried out as described in Example 1(b) with one tenth of the quantities, but no hydrochloric acid is used as catalyst and polycondensation is carried out by heat alone, the reaction mixture being heated to 80° C. for 4 hours. After removal of the water of condensation at 100° C., a stable dispersion is obtained in which the free formaldehyde is gasified with ammonia to convert it into hexamethylene tetramine which becomes absorbed on the dispersed particles and does not reduce the stability of the dispersion.

EXAMPLE 7

This example is carried out as in Example 4, employing the method described in Example 1(b), and in addition a freshly prepared solution of 1 mol of urea, 1 mol of isobutyraldehyde, 1 mol of thiourea and 1 mol of crotonaldehyde is added. After polycondensation carried out under the conditions indicated in Example 1(b), stable aminoplast dispersions are obtained which were shown (see Example 15) to be suitable for the production of self extinguishing foams by the diisocyanate polyaddition process. Foaming proceeds completely normally since the functionality of the polyether has not been changed.

EXAMPLE 8

This example is carried out as described in Example 1(b) but ε-caprolactam is replaced by the following chain breaking agents:

(a) 17 parts of dichloromaleic imide
(b) 25 parts of phenothiazine
(c) 14 parts of trichloroacetic acid amide
(d) 18 parts of 2-chloro-4,6-bis-ethylamino-s-triazine
(e) 15 parts of maleic acid hydrazide
(f) 21 parts of pentachlorobenzamide
(g) 16 parts of 1,3-dimethyl-3-(2-benzothiazolyl)-urea.

The compounds mentioned under (a) to (g) are suspended or dissolved in the polyether. Urea formaldehyde condensation is then carried out as described in Example 1(b). Stable aminoplast dispersions are obtained in which the chain breaking agents added are to a large extent incorporated in the polymethylene ureas by condensation or as chain breaking agents. The resulting aminoplast dispersions are very resistant to bacterial and microbial attack, do not smell of ammonia even after six months' storage are are eminently suitable for the production of flameproof polyurethane foams by the diisocyanate polyaddition process.

EXAMPLE 9

This example is carried out as described in Example 1(b) but the ε-caprolactam used in that example is replaced by (a) 20 parts of the following pyrazoline brightening agent

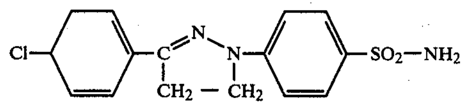

(b) 25 parts of

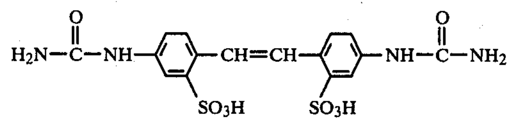

(c) 30 parts of

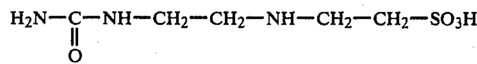

(d) 21 parts of

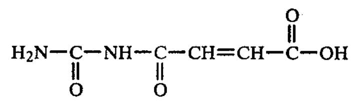

Stable aminoplast dispersions are obtained after polycondensation carried out as described in Example 1(b). Dispersions obtained with compounds (a) and (b) fluoresce very strongly in daylight and UV light and remain brilliantly white even after long exposure to daylight and do not lose their light fastness. The aminoplast dispersions obtained with compounds (c) and (d) contain acid groups which after neutralization by conversion into their sodium and potassium salts powerfully accelerate the foaming process in the reaction with polyisocyanates.

EXAMPLE 10

This example is carried out exactly as described in Example 1(b) but with 10 times the quantities and with the following polyhydroxyl compounds as dispersing agents:

(a) 1693 Parts of a linear propylene glycol polyether which contains terminal, for the most part secondary hydroxyl groups and has an average molecular weight of 2000 and a hydroxyl content of 1.7% and hydroxyl number 56.

(b) 1693 Parts of a trifunctional polyether of trimethylol propane, propylene oxide and ethylene oxide in which the ratio of propylene oxide to ethylene oxide is 87:13. This polyether contains primary hydroxyl groups and has a hydroxyl number of 35.

(c) 1693 Parts of a trifunctional polyether of trimethylolpropane, propylene oxide and ethylene oxide in which the ratio of propylene oxide to ethylene oxide is approximately 87:13. This polyether contains primary hydroxyl groups and has a hydroxyl number of 28.

(d) 1693 Parts of a polyether of trimethylolpropane and propylene oxide with a hydroxyl number of 375.

(e) 1693 Parts of a polyether of trimethylolpropane and propylene oxide with a hydroxyl number of 550.

(f) 1693 Parts of a polyether of trimethylolpropane and propylene oxide with a hydroxyl number of 650.

(g) 1693 Parts of a polyether of sucrose, trimethylolpropane (8:2) and propylene oxide with a hydroxyl number of 370.

(h) 1693 Parts of a polyether of trimethylolpropane and propylene oxide with a hydroxyl number of 902.

Stable, bright white aminoplast dispersions are obtained which are completely stable over a test period of 0.5 month even at 50° C. They are very suitable for foaming and can be foamed trouble-free.

EXAMPLE 11

This example is carried out exactly as described in example 1(b) but with only 1/100 of the quantities of starting material, and the formaldehyde used in Example 1(b) is replaced by the following aldehydes:

(a) 0.46 mols of acetaldehyde
(b) 0.46 mols of isobutyraldehyde
(c) 0.46 mols of crotonaldehyde
(d) 0.46 mols of chloral
(e) 0.46 mols of acrolein.

Stable dispersions of aminoplast condensates which contain about 20% by weight of solids are obtained in all cases (a) to (d).

EXAMPLE 12

This example illustrates the preparation of graphite-like aminoplast dispersions from benzoquinone and ammonia in a linear hydroxyl polyether of propylene oxide with an average molecular weight of 2000.

180 Parts of the above mentioned polyether (hydroxyl number 56) and 20 parts of p-benzoquinone are gasified with a stream of ammonia at 80° C. The formation of graphite-like dispersions sets in immediately while the unreacted p-benzoquinone is dissolved in the polyether. p-Benzoquinone has been quantitatively converted to aminoplast condensates after one hour. Small quantities of water (2.1 parts) are removed in a water jet vacuum over a period of 30 minutes. A black, 10% by weight dispersion of aminoplast condensates is obtained.

EXAMPLE 13

The procedure is exactly as described in Example 1(b), using 169 parts of the polyether described there, 27.6 parts of urea and 46 parts of formaldehyde solution (30% by weight); the ε-caprolactam used in Example 1 is replaced by the following dyes which are capable of condensation and in part fluorescent, these dyes being first dissolved or suspended in the polyether:

(a) 4 Parts of pyronine having the following formula

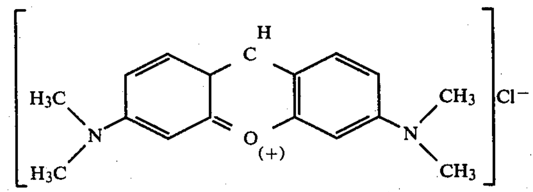

a red dye with yellow fluoroescence:

(b) 4 parts of rosamine of the formula

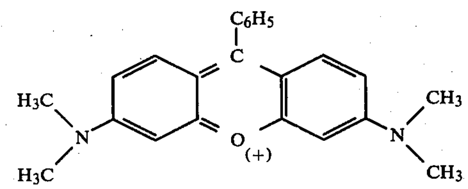

a red dye with yellow fluorescence;

(c) 4 parts of rhodamine of the formula

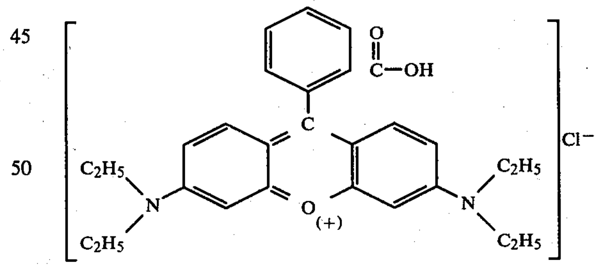

a red dye with a blue tinge and strong fluorescence;

(d) 4 parts of fluorescein of the formula

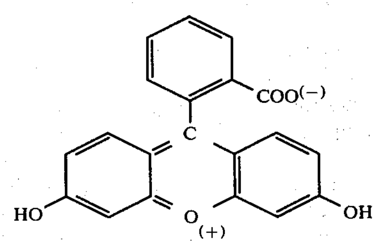

which dissolves in alkaline solution with a strong green fluorescence;

(e) 4 parts of gallein, a condensation product of gallic acid and phthalic acid anhydride which has the following formula

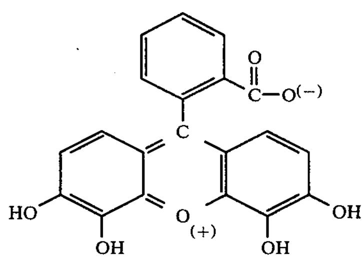

a red dye which forms blue alkali metal salts and violet aluminum and chromium salts;

(f) 4 parts of an unstable indamine dye of the formula

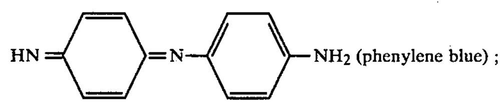

(g) 4 parts of Bindschedlers Green of the following formula

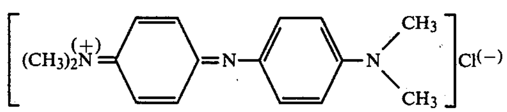

Condensation is carried out as in Example 1(b). The products obtained with the aid of compounds (a) to (g) are in all cases approximately 20% by weight polymethylene urea dispersions in which the reactive N-methylol groups take part in condensation reactions with the dyes, about 45% by weight of the total quantity of dye provided being fixed on the dispersed polymethyleneurea and fluorescent, colored polymethyleneureas being formed. Compared with the free dyes, the resulting fluorescent aminoplast dispersions have improved fastness to light.

The dispersions have the following color properties:

Dispersion (a): reddish dispersion, yellowish fluorescence;

Dispersion (b): red dispersion with yellow tinge;

Dispersion (c): reddish dispersion, fluorescence with bluish tinge;

Dispersion (d): yellowish dispersion, which shows strong green fluorescence when ammonia is added;

Dispersion (e): reddish dispersion, which is turned blue by the addition of methanolic sodium hydroxide solution and violet by the addition of aluminum or chromium salts;

Dispersion (f): dispersion with blue tinge;

Dispersion (g): green dispersion with increased resistance to pH changes within the range of pH 2-6.

EXAMPLE 14

The procedure is the same as in Example 1(b) and the same polyether is used for the preparation of the dispersion, but condensation is carried out with a mixture of 156 parts of urea, 94 parts of phenol, 26 parts of bisphenol A, 460 parts of 30% formalin solution and 92 parts of ε-cparolactam in 1693 parts of polyether as dispersing agent. 37 Parts of normal aqueous phosphoric acid are used as catalyst. The conditions under which condensation is carried out are the same as described in Example 1(b).

Bright white, stable dispersions of polymethylene ureas modified with phenol condensate are obtained. They have a solids content of about 20% by weight. The stable dispersion has a viscosity of 10,500 cP at 20° C.

EXAMPLE 15

Example of practical application:

The advantageous use of the aminoplast dispersion for producing foams with substantially reduced inflammability and reduced spreading of flames is illustrated in this Example.

100 Parts of the dispersion prepared in Example 1(b), 2.7 parts of water, 1.0 parts of a commercial polyether polysiloxane stabilizer, 0.2 parts of triethylenediamine and 0.2 parts of a tin(II) salt of 2-ethylcaproic acid are mixed together. 36.3 parts of tolylene diisocyanate (80% 2,4- and 20% 2,6-isomer) are added to this mixture and the components are vigorously mixed with the aid of a high speed stirrer. Foam formation sets in after a starting time of 10 seconds and a white, soft elastic polyurethane foam is obtained. This foam is open-celled and has a density of 40 kg/m$^3$ and a compression resistance (DIN 53 577) of 59 p/cm$^2$ at 40% compression. The foam obtained is more resistant to yellowing in the presence of light and industrial gases than a comparison sample which has been produced from the aminoplast free polyethers mentioned in Example 1. The rate of burning down a strip measuring 10×1 cm×0.5 cm is substantially reduced after ignition. The foam has become self-extinguishing.

The polyether polysiloxane stabilizer has the formula:

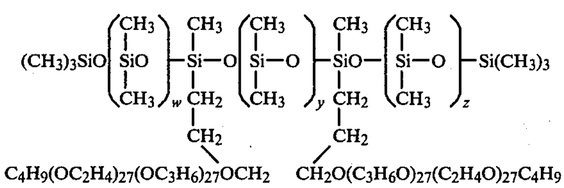

where the sum of w, y and z is about 16.

EXAMPLE 16

Practical example of application for carrying out the matrix reaction in accordance with German Offenlegungsschrift No. 2,037,613.

A block of foam produced according to Example 15 and measuring 30 cm×15 cm×5 cm (2250 cm$^3$) (88.3 parts) is impregnated with a solution of 150 parts of a tolylene residue isocyanate in 350 parts of methylene chloride and 15 parts of acetone and then pressed out, again impregnated and finally freed from non-adhering solution by passing it through rollers, approximately 137 parts of the residue isocyanate becoming adsorbed, this adsorption being accompanied by a high degree of swelling of the matrix.

After swelling, the block is gasified with steam containing approximately 2% of gaseous ammonia in a cylindrical reaction vessel. The phase interface reaction sets in at once, the temperature rising to 80° C., and is completed within one hour. A completely open-celled combination foam is obtained. The original swelling of the matrix is irreversibly fixed by the rapid change in the aggregate state of the reactants during the addition reaction so that after the reaction, the block is greatly increased in all its three spatial dimensions and shrink-resistant. It then has the following dimensions: 35 cm×18 cm×6 cm=3800 $cm^3$ (220 parts). Compared with the original matrix used, which acts as structural framework and has dimensions of 30 cm×15 cm×5 cm=2250 $cm^3$, approximately 1550 $cm^3$ of new space has therefore been produced and irreversibly fixed by soldification of the polyureas produced. A hard foam with a density of approximately 57 $kg/m^3$ is obtained. It is much more open-celled than the original matrix. The irreversibly fixed increase in volume is over 69 percent by volume based on the original volume of the matrix, and all the edges and surfaces of the original matrix have shifted completely symmetrically. The evolution of fumes is substantially reduced in this new combination foam and the foam is completely self-extinguishing.

EXAMPLE 17

Practical example of application for the production of light-fast lacquer coatings and films (a) The procedure is at first the same as in Example 1(b) except that a strongly branched polyester of phthalic acid anhydride and trimethylolpropane having a hydroxyl group content of about 8.5% is used as dispersing agent for preparing the aminoplast dispersion.

(b) 100 Parts of the finely divided dispersion are dissolved in 100 parts of ethyl acetate and mixed with 128 parts of a 75% by weight solution of triisocyanatohexylbiuret (16.4% isocyanate), and the mixture is cast on substrates after the addition of 0.5 parts of tin-II-octoate. Light-fast films with a dull gloss are obtained after 48 hours. They are immediately extinguished after ignition whereas, in comparable films produced from the polyhydroxyl compound which is free from aminoplast, the flames spread rapidly.

EXAMPLE 18

(a) The procedure is the same as in Example 17(a) and an approximately 20% by weight polymethyleneurea dispersion in a polyester of adipic acid and ethylene glycol (hydroxyl number 56) is prepared.

(b) 220 Parts of this dispersion are dehydrated in a water jet vacuum at 130° C. for 20 minutes. The reaction temperature of the dispersion is allowed to drop to 115° C. 44.4 Parts of 1-isocyanato-3,3,5-trimethyl-5-isocyanatomethylcyclohexane (0.2 mol) are then added and the reactants are converted to the $\alpha,\omega$-diisocyanatoprepolymer in the course of 30 minutes. The temperature of the isocyanate prepolymer is left to fall to 100° C. The prepolymer is diluted with 100 parts of toluene and the solution is cooled to 25° C. A solution of 16.4 parts of 1-amino-3,3,5-trimethyl-5-aminomethylcyclohexane in 422 parts of toluene and 522 parts of isopropanol is then added dropwise to the solution of isocyanate prepolymer over a period of 20 minutes with vigorous stirring. Stirring is continued for 10 minutes at room temperature after all the chain lengthening agent has been added. The elastomer dispersion solution obtained has a viscosity of 1800 cP at 25° C. When it is poured on glass substrates and the solvent is left to evaporate, very strong highly elastic films are obtained which are opaque with a dull gloss due to the presence of the pigment-like polymethyleneurea component and they have increased flame-resistance and a microporosity which is due to the fact that during formation of the film the pigment-like polymethyleneurea which acts as drying agent absorbs water and the coagulation of polymer which then sets in gives rise to the microporosity.

EXAMPLE 19

Practical example of application for producing elastomers with increased light-fastness and flame resistance.

A polymethyleneurea dispersion which has been prepared according to Example 18(a) and contains about 20% by weight of polymethyleneureas is used.

220 parts of the dispersion are dehydrated at 130° C. for 0.5 hours. The temperature is permitted to fall to 110° C. 80 parts of finely powdered 4,4-diisocyanatodiphenylmethane are then added all at once and the temperature is kept at 120° C. for 12 minutes. 18 parts of butane-1,4-diol used as chain lengthening agent are then stirred into the isocyanate prepolymer melt. The melt is then rapidly poured into a metal mold and heated to 110° C. in a heating cupboard. The highly elastic polyaddition product can be removed after only 20 minutes. If it is then heated at 110° C. for 24 hours, a white test plate is obtained which is highly elastic and tear resistant and has the following improved properties compared with those of an elastomer plate produced without polymethyleneurea:

(a) rate of burning down a 0.4 mm foil is reduced by 50%;

(b) increased resistance to discoloration in the heat at 160° C. in the presence of air.

Any of the other nitrogen compounds and carbonyl compounds disclosed as suitable herein may be substituted in the foregoing examples for making an aminoplast dispersion. Likewise, any other organic polyhydroxy compound disclosed as suitable herein may be used as the dispersion medium. The dispersions provided by the invention may be used in making polyurethanes by the processes disclosed in the aforesaid Saunders and Frisch book, Hoppe et al U.S. Pat. No. 2,764,565 and by other conventional processes. Any suitable organic polyisocyanate and blowing agent such as trichlorofluromethane, dichlorodifluoromethane, chlorotrifluoromethane disclosed in the Saunders and Frisch book and the Hoppe et al patent may be used. Also, any suitable known catalyst for a urethane reaction such as those disclosed in the Hoppe et al patent and in the Saunders and Frisch book may be used in making the polyurethane.

Although the invention has been described in detail for the purpose of illustration, it is to be understood that such detail is solely for that purpose and that variations can be made therein by those skilled in the art without departing from the spirit and scope of the invention except as it may be limited by the claims.

What we claim is:

1. A process for making a polyurethane resin which comprises reacting an organic polyisocyanate with a stable dispersion having a solids content of about 0.5% to about 80% by weight obtained by condensing ammonia, hydrazine or an organic compound having a molecular weight of from about 50 to about 400 and which contains at least two groups selected from the group consisting of $-NH_2$ and —NH— with benzoquinone or a compound of the formula R—Co—R′ in which R and R′ stand for the same or different radicals selected from the group consisting of hydrogen, $C_1$-$C_4$ alkyl groups which may carry chlorine substituents, $C_2$-$C_4$-alkenyl groups, $C_6$-$C_{10}$ aryl groups, $C_7$-$C_{10}$ aralkyl groups, $C_5$-$C_{10}$ cycloalkyl groups and semi-acetals obtained by reacting said carbonyl compounds with monohydric or dihydric aliphatic alcohols having one to ten carbon atoms in an organic polyhydroxyl compound having a molecular weight of from about 250 to about 14,000 as the reaction medium.

2. The process of claim 1, characterized in that the organic polyhydroxyl compound is a polyhydroxyl polyether within a molecular weight range of about 250 to about 4000.

3. The process of claim 1 wherein the reaction mixture contains a blowing agent and the polyurethane is a foam.

4. The process of claim 1 wherein the compound containing nitrogen is a urea, a urethane, a thiourea, a polycarboxylic polyamide, a biuret, a guanidine, a melamine, an amine, ammonia, a hydrazine, or a hydrazide.

5. The process of claim 1 wherein the carbonyl compound is formaldehyde and the nitrogen containing compound contains N-alkylol groups.

* * * * *